(12) United States Patent
Sivchenko et al.

(10) Patent No.: US 8,086,210 B2
(45) Date of Patent: Dec. 27, 2011

(54) FLOW BASED LAYER 2 HANDOVER MECHANISM FOR MOBILE NODE WITH MULTI NETWORK INTERFACES

(75) Inventors: Dmitry Sivchenko, Darmstadt (DE); Bangnan Xu, Darmstadt (DE)

(73) Assignees: Deutsche Telekom AG, Bonn (DE); Fachhochschule Giessen-Friedberg, Giessen (DE)

( * ) Notice: Subject to any disclaimer, the term of this patent is extended or adjusted under 35 U.S.C. 154(b) by 834 days.

(21) Appl. No.: 12/104,803

(22) Filed: Apr. 17, 2008

(65) Prior Publication Data
US 2008/0259874 A1   Oct. 23, 2008

(30) Foreign Application Priority Data

Apr. 17, 2007  (EP) .................................... 07106360

(51) Int. Cl.
*H04B 1/26* (2006.01)
(52) U.S. Cl. ...... 455/331; 455/436; 370/282; 370/395.5
(58) Field of Classification Search .................. 455/436, 455/331; 370/282, 389, 390, 395.5, 395.52
See application file for complete search history.

(56) References Cited

U.S. PATENT DOCUMENTS

| 6,049,825 | A | 4/2000 | Yamamoto |
| 6,775,278 | B1 | 8/2004 | Britton et al. |
| 7,835,743 | B2 * | 11/2010 | Zhang et al. ................. 455/436 |

FOREIGN PATENT DOCUMENTS

| EP | 1705847 | 9/2006 |
| WO | WO 0028715 A1 | 5/2000 |
| WO | WO-2005076649 | 8/2005 |

* cited by examiner

Primary Examiner — Christian Hannon
(74) Attorney, Agent, or Firm — Leydig, Voit & Mayer, Ltd.

(57) ABSTRACT

A method for handing-off a mobile node (MN) from one network interface to another network interface, the network interfaces being connected to a same level 2 (L2) network. The method includes detecting at least two network interface cards (NICs) of the MN that are connected to the same L2 network by at least one of an external device and the MN. A handover decision is made to hand-off a data flow of the MN from a first of the at least two NICs to a second of the at least two NICs. L2 information about the MN in one or more related network entities connected to the same L2 network is updated so as to perform seamless handover without changing an address on level 3 (L3) or higher levels.

21 Claims, 2 Drawing Sheets

FLOW BASED LAYER 2 HANDOVER MECHANISM FOR MOBILE NODE WITH MULTI NETWORK INTERFACES

CROSS REFERENCE TO RELATED APPLICATIONS

Priority is claimed to European patent application EP 07 106 360.6, filed Apr. 17, 2007, and which is hereby incorporated by reference herein.

FIELD

The invention relates to a method and system to hand off a mobile node (MN) from one network interface to another network interface (NIC), and in particular mobile node hand offs when the networks are connected to the same Layer 2 (L2) network.

BACKGROUND

In the future access networks a mobile node may transmit/receive data through a number of PoANs (Point of Attachment to the Network) based on different access technologies. The access aggregation network connecting PoANs uses L2 (Layer 2 of the Network Layer model) and L1 (Layer 1) devices (switches and repeaters). PoANs connected to such networks operate as L2 switches without usage of L3 (Layer 3) routing mechanisms.

The importance of pervasive connectivity to the network has increased over the last years and it is going to increase in the future. Mobile nodes with multiple network interfaces are able to access the network with a lot of advantages. Different network interfaces can then be used by a mobile node for data transmission depending on the access technology of the PoAN currently available for the user. Handover processes where the mobile node hands off between two network Interfaces of different technologies will therefore be an important issue in the future networks.

Existing mechanisms supporting handovers between different access technologies using two or more network interfaces use L3 or higher Layer methods to hand off traffic flows between two interfaces. This is because in such mechanisms each network interface of the mobile node connected to the same L2 network must have its own IP (Internet Protocol) address. Conventional IP configuration and mobility protocols like Mobile IP (MIP) or Session Initiation Protocol (SIP) do not consider the fact that different PoANs used by the mobile node can be integrated into the same converged access aggregation L2 network and one IP address may be used by all network interfaces of the mobile node in the non-simultaneous manner. The unique features of data transmission on L2 Within the converged access aggregation L2 network and over the wireless links are not taken into consideration by these prior art mechanisms. The IP address of the mobile node is therefore changed during handover between two Interfaces and mobility protocols above L2 must be applied to retain established sessions. This causes an additional handover delay and potential load in the network. For example, at least one round trip time between the mobile node and its corresponding node is required to re-establish a session using SIP or Host Identity Protocol or Stream Control Transmission Protocol and an additional overhead of at least one IP header is caused by the IP-in-IP encapsulation used by the MIP. These factors degrade the traffic performance that may therefore be unacceptable for time-critical multimedia services like IPTV (IP television) or video telephony.

SUMMARY

In an embodiment, the present invention provides a method for handling-off a mobile node (MN) from one network interface to another network interface, the network interfaces being that is connected to a same layer 2 (L2) network. The method includes: detecting at least two network interface cards (NICs) of the MN that are connected to the same L2 network by at least one of an external device and the MN; making a handover decision to hand-off a data flow of the MN from a first of the at least two NICs to a second of the at least two NICs; and updating L2 information about the MN in one or more related network entities connected to the same L2 network so as to perform seamless handover without changing an address on layer 3 (L3) or higher layers.

In another embodiment, the present invention provides a mobile node (MN) from a network interface to another network interface connected to a same Level 2 (L2) network. The MN includes: a detection module configured to detect network interface cards (NICs) of the MN which are connected to the same L2 network by one of an external device and the MN; a handover decision module configured to make handover decisions so as to hand-off data flows of the MN from a first network interface to another network interface; and a handover execution module configured to update L2 information about the MN in related network entities connected to the same L2 network so as to perform seamless handover while retaining the address in layer 3 (L3) networks or higher layers.

BRIEF DESCRIPTION OF DRAWINGS

Aspects, features, steps and advantages of the present invention can be further appreciated from the accompanying figures and description of certain illustrative embodiments.

DETAILED DESCRIPTION

Figure 1:
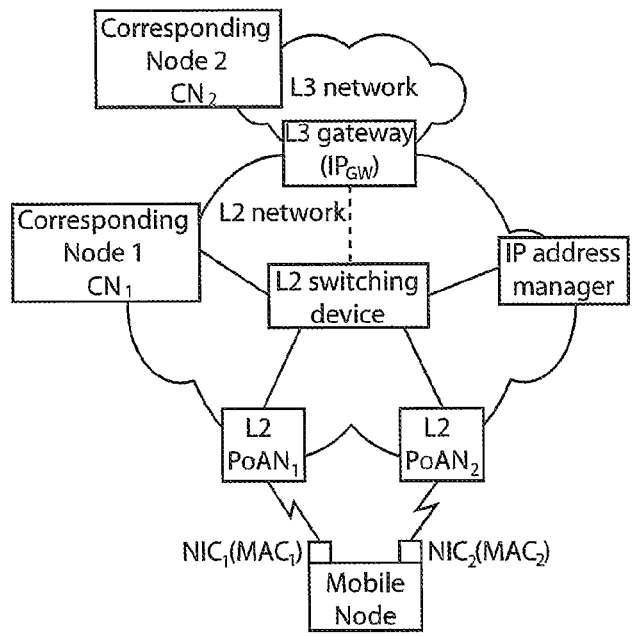
FIG. 1 depicts an embodiment Where two NICs of the MN are connected to the same L2 network.

By Way of overview and introduction an embodiment of the invention avoids the conventional art complicated handover mechanism on the L3 or above layers which must be applied if the IP address of the mobile node changes. Described is at least one mechanism exploiting unique features of data transmission on L2 that enables seamless handovers using two or more interfaces of the mobile node. Different operations are developed for the outgoing and incoming data flows. The flow based L2 handover can be applied for outgoing flow or incoming flow separately or both at the same time. In one embodiment a method updating mobile node related information in other network elements needed to transmit data to the mobile node eliminates handover delay and possible overhead in the access network. Embodiments of the invention enable the seamless handover of mobile nodes using two or more NICs (Network Interface Card) between PoANs connected to a L2 access network.

The following methods outline various embodiments:
1. Method to detect NICs of the mobile node (MN) which are connected to the same L2 network.
2. Method to inform a network element about new MNs connecting to the network by new functions which may be integrated into PoANs or into the MN. The information about the MN comprises the L2 address of a NIC used to connect to the PoAN and may include additional information depending on the communication interface deployed by the PoAN. The information about the MN may be used by a network element for any other purpose like mobility or location of a particular NIC in the network.
3. Method to generate and send gratuitous L2 signaling PDUs to update L3 9L2 mapping tables and to create a new L2 path for L2 PDUs destined to the MN.

A handover process within the considered converged access aggregation L2 network can be separated in following three stages:
1. Detect NICs of a MN that are connected to the same L2 network. This is required in order to be able to apply the proposed solution.
2. Take handover decision to hand off data flows of the mobile node from one interface to another. Any handover policies may be applied for handover decisions, the proposed mechanism for L2 handover execution using multiple network interfaces of the mobile node is independent from them.
3. Perform operations needed to update L2 information about the mobile node in related network entities connected to the same L2 network to realize seamless handover.

The MN detects whether its NICs are connected to the same L2 network to know whether the configured IP address can be used for the IP data communication via another NIC. To be compatible with existing L3 mobility solutions the MN must be able to configure a new IP address if needed. If NICs of the MN are connected to the same L2 network, handover policies must be applied to make handover decision and initiate L2 handover process if necessary. An example of handover policies may be: use 802.3 based (Ethernet) NIC if available, otherwise 802.11 based (WiFi) NIC. After the handover decision the proposed handover operations must be performed to re-route outgoing IP data packets via the new NIC. IP packets destined to the MN must also be delivered to the MN using the new NIC via the PoAN whereto the new NIC is connected.

By way of example, FIG. 1 depicts an embodiment of the invention with a network scenario where NICs of the MN are connected to the same L2 network and where L2 handover mechanisms may apply. However, the invention is not so limited and other network scenarios are within the scope of the invention.

Figure 2:
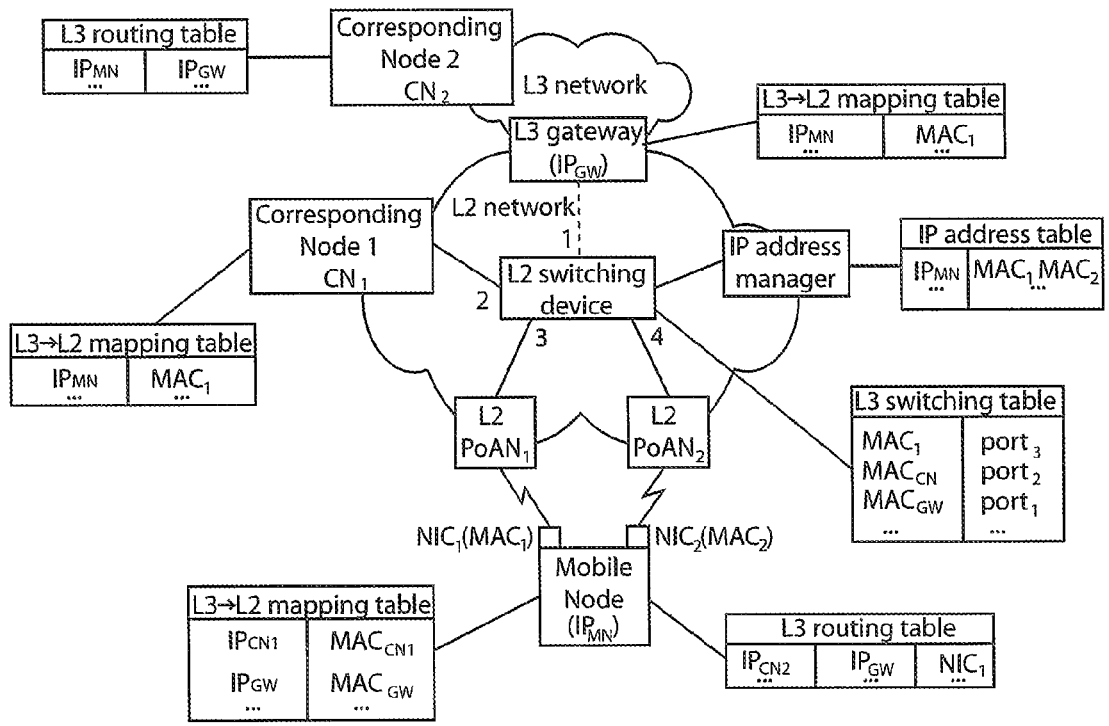
FIG. 2 shows the information needed in network entities to transmit IP packets to and from the mobile node using one of its NICs in accordance with an embodiment.

The MN has multiple network interfaces. In the example in FIG. 1 the MN has two NICs: NIC1 and NIC2 with corresponding MAC1 (Medium Access Control) and MAC2 L2 addresses assigned to every NIC to uniquely identify it in the world. In the following description the MN's NIC1 is used for incoming and outgoing data packets before a handover, NIC2 can be used after handover. NICs installed on the MN can be with the same or different access technologies. Both NICs may be connected either to a single or different L2 PoANs. The IP address manager in the L2 network assigns L3 IP addresses to mobile nodes using the address configuration protocol. The IP address manager also informs the MN about the default IP gateway that can be used to send IP packets to the nodes placed outside the L2 network with which the MN is connected. The MN then communicates either with nodes in the same L2 network directly (Corresponding Node 1 (CN1) in FIG. 1) or with nodes located in other networks via the IP gateway (Corresponding Node 2 (CN2) in Figure The L2 address of the next node where a data frame is to be sent must be known in order to create and transmit L2 PDUs (protocol data unit) containing L3 SDUs (service data unit). Resolution tables containing information about the mapping between L3 and L2 addresses exist in all network entities that have L3 functionality. The Address Resolution Protocol (ARP) for IPV4 and the Neighbor Discovery Protocol (NDP) for IPV6 are used to create these mapping tables. Prior to the IP data transmission between two network entities they must learn about L3 9L2 address resolution using corresponding protocols. Accordingly, the MN needs to know the IP of the L3 gateway for packets sent to nodes outside the L2 network. Resolving the IP address of the GW (gateway) the MN learns its L2 address and is therefore able to transmit L2 PDUs to it. The L2 path for the L2 PDUs within the L2 network is built automatically during exchange of signaling messages of L3 9L2 resolution protocols. The information stored on appropriate network elements to transmit IP packets between different network entities is shown in FIG. 2.

The L3 routing table of the MN stores the L3 information about the GW that is used as the next forwarding node for L3 SDUs (IP packets) destined to the nodes located outside the L2 network. The routing table also contains the information which NIC is used for outgoing packets generated by the MN. In the L3-L2 mapping table of the MN the L2 information of the appropriate L3 node is stored. In the example in FIG. 2 this is the MAC of the CN1-MACCN1 for IP packets destined to the CN1 since it is located in the same L2 network and the MAC of the GW-MACGW since it is used as the next node for IP packets destined to the CN2. The mapping tables of both L3 gateway and CN1 contain information that IP packets destined to the IP of the MN are sent using its MAC1 that is connected to the L2 network via PoAN1. The L2 switching devices deliver L2 PDUs between network elements within the converged access aggregation L2 network. In FIG. 2 the L2 switching table contains information to which port the L2 PDUs destined to particular L2 addresses are sent. L2 PDUs destined to the MAC1 of the MN's NICI are sent into the port number 3 that is linked to the L2 PoAN1 whereto the MN's NICI is connected. In this way the correct delivery of L2 PDUs is guaranteed. The IP packets from the nodes outside the L2 network are sent to the L3 gateway that forwards them further to the MN using L2 switching in the similar manner. The information about IP gateway that is used to forward packets to the MN is contained in L3 routing tables of particular nodes outside the L2 network.

As far as one of MN's NICs gets connected to a PoAN, the MN has to detect whether the MN has already a connection to the same L2 network using its other NICs. If the MN connects to the L2 network for the first time, a new IP address is configured for the MN's NIC so that the MN can communicate with other nodes using topologically correct IP address. In one embodiment, integrated mechanisms detect the NICs of the MN which are connected to the same L2 network with IP configuration mechanisms. The first assignment of the IP address to the MN may be called "initial network entry" since the MN enters the L2 network for the first time. signaling messages of the IP configuration protocol are be exchanged between the MN and the IP Address Manager (IPAM). The MN can get information about L2 addresses of all NICs available on the MN. During the IP configuration signaling exchange the MN informs the IPAM about the list of L2 addresses available on the MN. The IPAM stores this information in its database. This information can further be used to detect MNs already connected to the L2 network.

The DHCP (Dynamic Host Configuration Protocol) that may be extended to support this information exchange defines a four-Way handshake to configure a new IP address for the MN:
1. The MN sends DHCP Discover message to discover DHCP servers (IPAM).
2. The DHCP server sends DHCP Reply to inform the MN about its presence in the network.
3. The MN sends DHCP Request message to request a new IP address for itself.
4. The DHCP server allocates a new IP address for the MN from its IP address Pool and answers to the MN with DHCP Acknowledgement message. The DHCP Request message may be extended to inform the DHCP server about MAC addresses of NICs available on the MN. In case the list of L2 addresses available on the MN changes if, as an example, a new NIC has been installed on the MN, the MN generates a new DHCP Request message with updated list of installed NICs to the DHCP Server. The DHCP server then updates the L2 address list of the MN in its database and answers with DHCP Acknowledgement message to the MN as in the case of refreshing of the MN's IP address after a timeout.

When another NIC of the MN gets connected to the same L2 network, the MN starts the same four-Way handshake with the DHCP server. In the DHCP Discover message the L2 address of the NIC for which a new IP address must be configured, is contained. The DHCP server looks in its database for the L2 address contained in the signaling message. Other information about the MN contained in the DHCP Discover message may additionally be used for the search in the database of the DHCP server for a particular MN. If the search succeeds, an IP address has already been provided for this MN. The DHCP server then sends to the MN the DHCP Reply message with a new flag Wherewith the DHCP server informs the MN that the new NIC of the MN is connected to the same L2 network where other MN's interfaces are also connected. Optionally, the L2 address of NICs which have already been connected to the L2 network may be provided in the message as well as the already configured MN's IP address, too. Using this information the MN detects that it stays in the same L2 network so that a L2 handover between different NICs of the MN may be performed. Additional interface-specific information (for instance, but not limited to maximum transfer unit size), may be requested by the MN at the DHCP server using further or same DHCP Request and DHCP Acknowledgement messages as defined by the IP management protocols.

The process of determining whether MN's NICs are connected to the same L2 network may be accelerated by the following embodiment. The first network element in the L2 network that learns about a new connection of a MN to the L2 network is the PoAN to which the MN's NIC is connected. In every access technology the L2 address of the NIC used to connect with a PoAN is known by the PoAN to establish a L2 connection between the MN's NIC and the PoAN. Thus, the PoAN may inform the IPAM about the L2 address of the new MN's NIC in the L2 network. The L2 address of the MN can be used as source L2 address for the L2 PDU transmitted to the IPAM so that a switching path to the correct PoAN where the MN's NIC is connected to can automatically be established. Thereby the IPAM can generate a direct reply to the MN Without reception of the request from the MN.

In an optional embodiment, the MN sends a L2 message from one NIC to its other NICs. If it gets an answer it knows, that the other NICs are in the same L2 Network.

Figure 3:
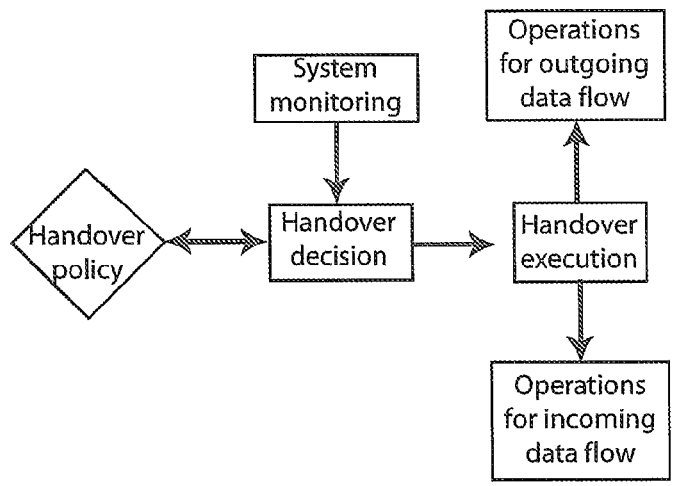
FIG. 3 shows a structural overview of a handover execution module in accordance with an embodiment.

FIG. 3 presents a typical handover execution algorithm that can be defined for the MN in order to execute a L2 handover.

Handover policies contain algorithm which are loaded and applied by the handover decision module. For example, a handover policy may be a rule to use Ethernet NICs if they are connected to the network and WiFi NICs in other cases. The threshold values for Signal to Noise Ratio (SNR) or Bit Error Rates (BER) may also be policies for a handover between two NICs. After loading of the handover policies the handover decision module evaluates information provided to it by the system monitoring module. This module provides to the handover decision module such information as SNR and/or BER for WiFi NICs, NICs used for IP communication and NICs connected to the network. By evaluating this information using pre-loaded handover policies a handover decision module may initiate a handover to hand off IP data flows maintained by the MN to be transmitted using a new NIC connected to the same L2 network.

For example in FIG. 2 the MN can hand off from NIC 1 connected to the L2 network using PoAN1 to the NIC2 connected via PoAN2. For clarity, the terms "old NIC" and "new NIC" are used for NIC] and NIC2 respectively. Additional information for the proposed L2 handover algorithm can include information about L2 addresses of network entities with which the MN communicates. In FIG. 2 these are the L2 addresses of the CN1 and GW although the MN communicates with CN1 and CN2, not with the GW. The GW is used to forward IP packets between the MN and the CN2, on the L2 the MN communicates however with the GW, not with the CN2.

Since the MN stays in the same L2 network, it can further use the same IP address configured during initial network entry. The handover between two PoANs may therefore be processed on L2. To execute handover on L2, the MN performs specific operations in order to hand off either incoming or outgoing data flows, or both. The handover execution module is triggered by the handover decision module. The handover decision module informs the handover execution module about the NIC that is currently used by the MN, about the NIC that can be used for communication after handover, about the list of L2 addresses of network entities connected to the same L2 network and communicating with the MN, and about direction of flows for which the handover can be performed. For example in FIG. 2 the data structure given to the handover execution module for the case when the MN hands off from the NIC] to the NIC2 will look like:
Current NIC: NIC 1 (MAC1)
Target NIC: NIC2 (MAC2)
List of correspondent L2 addresses: MACCN1, MACGW.
Handover for data flows: incoming and outgoing Operations for outgoing data flow are required to change the NIC used for IP packets generated by the MN and sent towards CN1 and CN2. These operations therefore comprise system commands required to modify the routing entry of the MN for outgoing IP data packets. After that all outgoing packets are sent using a new NIC instead of the old NIC. For example in FIG. 2 the MN will re-configure its L3 routing table so that all further L2 PDUs will be sent into the network using its NIC2. No further operations are required for the outgoing data flow generated by the MN as other information like L2 address of the IP gateway is already known as result of previous data communication.

Operations for incoming data flow need to be performed within L2 network in order to allow IP packets destined to the MN to be delivered to the MN via the new NIC. All network entities connected to the same L2 network as the MN will send L2 PDUs to the old NIC of the MN even after handover until the timeouts of the L3-L2 tables expire. Only after that the corresponding nodes 1 initiate the exchange of address resolution protocol messages to update their mapping tables. In FIG. 2, the CN1 and the GW send data further to the MN's MAC1 since their L3 9L2 resolution tables contain this information (IPMN->MAC 1) valid only before handover, however. To eliminate this delay, in an embodiment the MN itself updates L3 9L2 mapping tables of the network entities sending L2 PDUs to the appropriate nodes in the same L2 network. In FIG. 2, the MN updates the mobile node related information in the mapping tables of the CN1 and GW to IPMN->MAC2 instead of IPMN->MAC1. Thereafter these network entities will send L2 PDUs to the MN's NIC2. For this purpose the handover decision module transfers a list of L2 addresses used by the MN to the handover execution module. The MN then sends L2 signaling PDUs updating mapping tables to these nodes without involving L3 delivery mechanisms. There are a least three possibilities to send the updating information to the network elements with which the MN communicates.

1. The mentioned list of L2 addresses provided by the system monitoring module may be used. The updating information may be sent unicastly to the appropriate nodes. In FIG. 2 if Address Resolution Protocol is used to create mapping tables of nodes, the MN creates two ARP Reply messages where the mapping information IPMN->MAC2 is contained. The first reply message is sent to the CN1 and the other reply message is sent to the GW. Similar updates of address mapping tables can be exploited by malicious users. Since the existing address resolution as well as address configuration protocols do not have any security protection, a hacker may create a sequence of address resolution signaling messages so that IP flows of network users could be re-routed and forwarded through the computer of the hacker. Such kind of attacks is known as "man-in-the-middle" attacks. To eliminate this, signaling messages used to create and modify mapping tables must be protected. Examples of additional security proposals include, but are not limited to, either a pre-distributed private and public keys to use PGP signing and encoding of signaling packets or a proposed solution "S-ARP: Secure Address Resolution Protocol" from Milan University designed to authenticate the originator of signaling messages used by address resolution protocols which may be deployed in the converged access aggregation L2 networks.

2. If any multicasting mechanisms are supported an L2, the MN may multicast the L2 signaling PDU with updating mapping information IPMN-MAC2. In this case only one L2 signaling PDU needs to be sent by the MN. Only the nodes sharing the same multicast L2 address will receive this message and update their mapping tables.

3. The L2 signaling PDU may also be broadcasted in the converged access aggregation L2 network. The nodes which have an existing mapping for the MN can update their mapping tables and nodes which do not have information about the MN in their mapping tables can create a new entry for the MN. Additional flooding and overhead is the main drawback of such approach.

Additionally, a L2 path in the L2 network to the PoAN where the new MN's NIC is connected to is established. In FIG. 2, for example, a new L2 path to the MN's MAC2 can be created, i.e. a new entry is added into the L2 switching table of the L2 switching device: MAC2->port4. After that the L2 switching device can forward L2 PDUs destined to the MAC2 into the port number 4 Whereto the PoAN2 used by the MN's NIC2 is linked. This can be done automatically by all L2 devices upon reception of a L2 PDU wherein the source L2 address is the L2 address of the MN's NIC that can be used after handover. The MN sends therefore the L2 signaling PDUs used to update mapping tables using the new NIC after handover. The L2 source address of the single message (if multicast or broadcast is used) or a group of messages to each node with which the MN communicates (if unicast is used) is set to the L2 address of the new NIC. In FIG. 2 the L2 address of L2 signaling PDUs can be set to the MAC2, the L2 switching device can automatically create a new entry MAC2->port4 in its switching table while forwarding this message to the destination.

Figure 4:
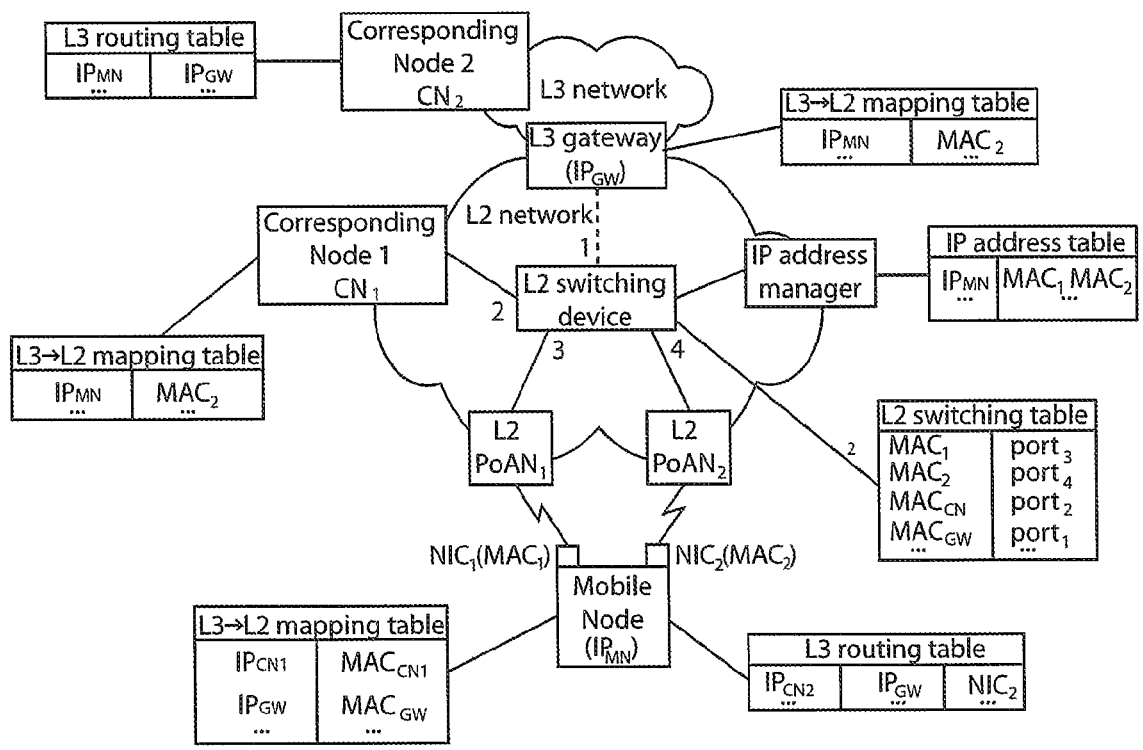
FIG. 4 shows information stored on network entities after L2 handover in accordance with an embodiment.

FIG. 4 shows the configuration of all network entities in the L2 network after performed handover operations.

These are the following modifications after handover:
1. The L3 routing table of the MN so that all L2 PDUs can be sent using NIC2. This information has been modified for outgoing data flow generated by the MN,
2. The mapping tables of the CN1 and GW with which the MN communicates on L2 changed for incoming data flow destined to the MN.
3. The L2 switching table of the L2 switching device where a new entry for the MN's MAC2 has automatically been created while the L2 switching device has forwarded L2 signaling PDUs used to update L3 9L2 mapping tables for incoming data flow.

After that the MN continues the communication uninterrupted. The described mechanisms are transparent for network and higher layers since the L3 IP address of the MN has not been changed. Therewith there is no impact on higher layers communications. The handover delay is negligible since the described operations are performed an L2, the creation of the L2 path through the L2 network is performed even on the hardware layer.

Thus, While there have been shown, described, and pointed out fundamental novel features of the invention as applied to several embodiments, it will be understood that various omissions, substitutions, and changes in the form and details of the illustrated embodiments, and in their operation, may be made by those skilled in the art Without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A method for handing-off a mobile node (MN) from one network interface to another network interface, the network interfaces being connected to a same layer 2 (L2) network, the method comprising:
   detecting at least two network interface cards (NICs) of the MN that are connected to the same L2 network;
   making a handover decision to hand-off a data flow of the MN from a first of the at least two NICs to a second of the at least two NICs;
   updating L2 information about the MN in one or more related network entities connected to the same L2 network so as to perform seamless handover without changing an address on layer 3 (L3) or higher layers
   requesting, from an internet protocol address manager (IPAM), a first assignment of an IP address to the MN when the MN enters the L2 network for a first time, wherein the IPAM is a dynamic host configuration protocol (DHCP) server;
   informing, by the MN, the IPAM of information on other NICs connected to the MN,
   storing, by the IPAM, the information;
   detecting MN NICs already connected to the L2 network based on the stored information: and
   performing a handshake protocol between the MN and the DHCP server, the handshake protocol including:

receiving at the DHCP server a request message containing a list of medium access control (MAC) L2 addresses of installed NICs;

storing in a database accessible by the DHCP server the list of L2 addresses;

generating, by the MN, a new DHCP request message containing an updated list of L2 addresses, if the list of L2 addresses available on the MN changes;

sending the updated list to the DHCP Server, wherein the DHCP server then updates the L2 address list in the database and answers with a DHCP acknowledgement message to the MN;

when an additional NIC of the MN gets connected to the same L2 network, starting, by the MN, the handshake protocol with the DHCP server;

sending to the DHCP server a DHCP discover message containing the L2 address of the additional NIC for which a new IP address should be configured;

searching, by the DHCP server, the database for the L2 address contained in the DHCP discover message, wherein other information about the MN contained in the DHCP discover message may additionally be used for the search in the database;

if the search succeeds, replying to the MN with a first DHCP reply message containing a flag indicating that the IP address of the DHCP discovery message has already been provided;

then sending, by the DHCP server, to the MN a second DHCP reply message with a new flag indicating that the additional NIC of the MN is connected to the same L2 network as other NICs of the MN, wherein the L2 address of the other NICs are provided in the message as well as the IP address of the MN;

arriving at a determination, by the MN using the second DHCP reply message, to remain in the same L2 network; and performing a L2 handover between different NICs of the MN.

2. The method according to claim 1, wherein the L2 information includes an L2 address of a NIC connected to a point-of-attachment-to-the-network (PoAN), and further includes additional information dependent on a communication interface deployed by the PoAN.

3. The method according to claim 1, further comprising generating, by the MN, L2 signaling protocol data units (PDUs) for updating one or more L3->L2 mapping tables and for creating a new L2 path for L2 PDUs destined to the MN.

4. The method according to claim 1, wherein the NICs implement at least one protocol selected from IEEE 802.3 based (Ethernet), IEEE 802.11 based (WiFi), IEEE 802.16 (WiMAX), IEEE 802.20, Bluetooth, GSM, UMTS, HSxPA, and CDMA.

5. The method according to claim 1, wherein a PoAN is the first network element in the L2 network that learns about a new connection of a MN to the L2 network, and wherein the PoAN knows in each access technology the L2 address of the NIC used to connect with the PoAN to establish a L2 connection between the MN's NIC and the PoAN so as to enable the PoAN to inform the IPAM of the L2 address of the NIC of the MN of the new connection in the L2 network.

6. The method according to claim 5, wherein the L2 address of the MN is useable as a source L2 address for the L2 PDU transmitted to an IPAM so that a switching path to a correct PoAN connected to the MN's NIC is automatically established.

7. The method according to claim 1, wherein a handover decision module on the MN contains an algorithm of at least one handover policy, and further comprising:
receiving, by the handover decision module, information from a monitoring module; and
triggering, by the handover decision module, based on the information, a handover execution module.

8. The method according to claim 7, wherein the at least one handover policy includes a rule to use an Ethernet NIC if an Ethernet NIC is connected to the network, else to use a WiFi NIC.

9. The method according to claim 8, wherein the at least one handover policy includes at least one of a threshold value for Signal-to-Noise Ratio (SNR) and Bit Error Rates (BER) between two NICs.

10. The method according to claim 1, wherein subsequent to a handover the MN reconfigures an L3 routing table associated with the MN so that L2 PDUs are sent to the network using the second NIC.

11. The method according to claim 10, further comprising at least one of:
1) transferring, by a handover decision module, to a handover execution module a list of L2 addresses used by the MN for communication, and then sending, by the MN, L2 signaling PDUs updated L3->L2 mapping tables to nodes without involving L3 delivery mechanisms;
2) sending unicastly the list of L2 addresses to appropriate nodes on L3; and
3) broadcasting the L2 signaling PDUs to a converged access aggregation L2 network.

12. A mobile node (MN) handing off from a network interface to another network interface connected to a same Layer 2 (L2) network, comprising:
a detection module configured to detect network interface cards (NICs) of the MN which are connected to the same L2 network;
a handover decision module configured to make handover decisions so as to handoff data flows of the MN from a first network interface to another network interface;
a handover execution module configured to update L2 information about the MN in related network entities connected to the same L2 network so as to perform seamless handover while retaining the address in layer 3 (L3) networks or higher layers;
a requesting module configured to request from an IP Address Manager (IPAM) a first assignment of an IP address to the MN, wherein the request is made after the MN enters the L2 network for a first time;
an informing module configured to inform the IPAM about all other NICs on the MN, wherein the IPAM, stores the information about all other NICs; and
a detecting module configured to detect MNs already connected to the L2 network, wherein the detection is made using the information about all other NICs;
wherein the IPAM is a dynamic host configuration protocol (DHCP) server configured to perform a handshake protocol between the MN and the DHCP server, the handshake protocol including:
receiving at the DHCP server a request message containing a list of medium access control (MAC) L2 addresses of installed NICs;
storing in a database accessible by the DHCP server the list of L2 addresses;
generating, by the MN, a new DHCP request message containing an updated list of L2 addresses, if the list of L2 addresses available on the MN changes;

sending the updated list to the DHCP Server, wherein the DHCP server then updates the L2 address list in the database and answers with a DHCP acknowledgement message to the MN;

when an additional NIC of the MN gets connected to the same L2 network, starting, by the MN, the handshake protocol with the DHCP server;

sending to the DHCP server a DHCP discover message containing the L2 address of the additional NIC for which a new IP address should be configured;

searching, by the DHCP server, the database for the L2 address contained in the DHCP discover message, wherein other information about the MN contained in the DHCP discover message may additionally be used for the search in the database;

if the search succeeds, replying to the MN with a first DHCP reply message containing a flag indicating that the IP address of the DHCP discovery message has already been provided;

then sending, by the DHCP server, to the MN a second DHCP reply message with a new flag indicating that the additional NIC of the MN is collected to the same L2 network as other NICs of the MN wherein the L2 address of the other NICs are provided in the message as well as the IP address of the MN;

arriving at a determination, by the MN using the second DHCP reply message, to remain in the same L2 network; and performing a L2 handover between different NICs of the MN.

13. The mobile node according to claim 12, wherein the L2 information includes an L2 address of a NIC that connects to a Point of Attachment to the Network (PoAN), and further includes additional information dependent on a communication interface deployed by the PoAN.

14. The mobile node according to claim 12, further comprising a generation and sending device configured to generate and send L2 signaling protocol data units (PDUs) to update L3->L2 mapping tables, and to create a new L2 path for L2 PDUs destined to the MN.

15. The mobile node according to claim 12, wherein the NICs implement at least one protocol selected from IEEE 802.3 based (Ethernet), IEEE 802.11 based (WiFi), IEEE 802.16 (WiMAX), IEEE 802.20, Bluetooth, GSM, UMTS, HSxPA, and CDMA.

16. The mobile node according to claim 12, wherein the L2 address of the MN is useable as a source L2 address for the L2 PDU transmitted to an IPAM so that a switching path to a correct PoAN collected to the MN's NIC is automatically established.

17. The mobile node according claim 12, further comprising:
  a handover decision module on the MN configured to load and apply an algorithm of at least one handover policy; and
  a monitoring module configured to provide information to the handover decision module so as to trigger a handover execution module.

18. The mobile node according to claim 17, wherein the at least one handover policy includes a rule to use an Ethernet NIC if an Ethernet NIC is connected to the network, else to use a WiFi NIC.

19. The mobile node according to claim 17, wherein the at least one handover policy includes at least one of a threshold value for Signal-to-Noise Ratio (SNR) and Bit Error Rates (BER) between two NICs.

20. The mobile node according to claim 12, further comprising a reconfiguration device configured to reconfigure a L3 routing table after a hand over so that all further L2 PDUs are sent to the network using the another NIC.

21. The mobile node according to claim 20, further comprising at least one of:
  1) the handover decision module is configured to transfer to the handover execution module a list of L2 addresses used by the MN for communication;
  2) the MN is configured to send to the L2 signaling PDUs updated L3->L2 mapping tables without involving L3 delivery mechanisms;
  3) the list of L2 addresses is sent unicastly to appropriate nodes on L3; and
  4) the L2 signaling PDUs are broadcast to a converged access aggregation L2 network.

* * * * *